Nov. 22, 1966   A. BEDOL   3,286,705
COLLAPSIBLE BARBEQUE GRILLE
Filed Dec. 7, 1964

INVENTOR.
ALAN BEDOL
BY
Sanford Schnurmacher
ATTORNEY.

United States Patent Office 3,286,705
Patented Nov. 22, 1966

3,286,705
COLLAPSIBLE BARBEQUE GRILLE
Alan Bedol, Shaker Heights, Ohio, assignor to Marshallan Products, Inc., Cleveland, Ohio, a corporation of Ohio
Filed Dec. 7, 1964, Ser. No. 416,578
1 Claim. (Cl. 126—25)

This invention relates to food cooking devices and particularly to barbeque grilles.

The primary object of the invention is to provide a collapsible barbeque grille that may be assembled without the use of any bolts or screws.

Another object is to provide a portable barbeque grille, of the type stated, whose parts are joined through resiliently interfitted elements, requiring no mechanical adjustment in their assembly or dis-assembly.

A further object is to provide a barbeque grille that may be completely collapsed for packaging, or storage, while at the same time being capable of easy re-assembly, without the use of any tools.

Still another object is to provide a collapsible barbeque grille that may be inexpensively fabricated from sheet metal tubing and stampings.

These, and other objects of the invention, will become apparent from a reading of the following specification and claim, together with the accompanying drawing, wherein like parts are referred to and indicated by like reference numerals, and wherein:

Figure 1:
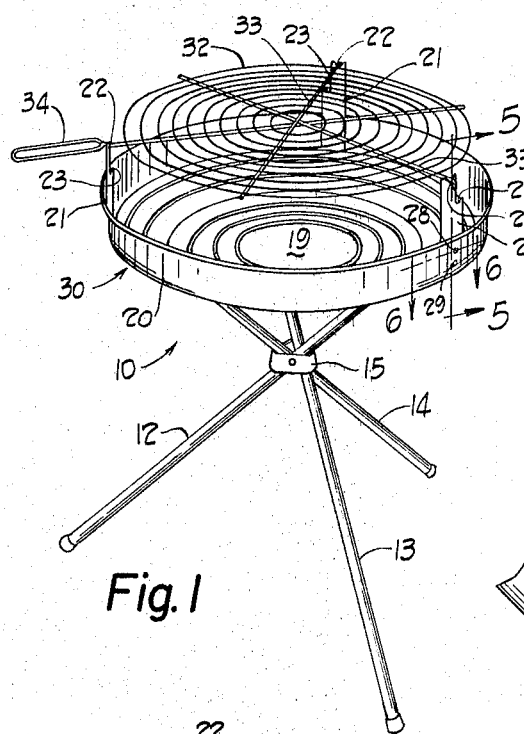
FIGURE 1 is a perspective view of the collapsible barbeque grille that is the subject of this invention.

Referring more particularly to the drawing there is seen in FIGURE 1 the collapsible barbeque grille, that is the subject of this invention, broadly indicated by reference numeral 10.

The device is made up of 3 elements, namely, the fire bowl 30, supporting tripod assembly 11, and brackets 21, all stamped and shaped from sheet metal.

The tripod 11 has three tubular legs 12, 13 and 14, pivotally joined through a collar 15.

Figure 3:
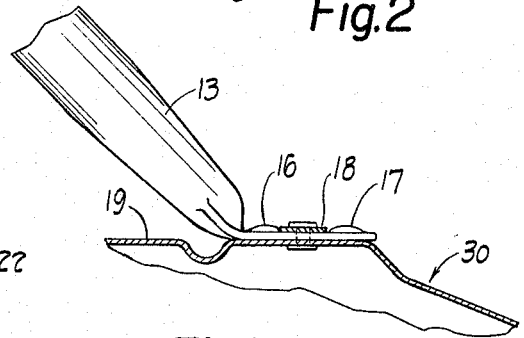
FIGURE 3 is a sectional view taken along the line and in the direction of the arrows 3—3 of FIGURE 2.

Each leg has a laterally extending foot 16, formed by flattening the upper end of the leg, lying at an angle to the long axis of the leg, such that when the tripod legs are in their expanded positions the feet will lie in a horizontal plane, as is seen most clearly in FIGURE 3.

Each foot 16 has a raised toe portion 17 positioned at the outer end thereof.

The fire bowl 30 is stamped from a single circular sheet metal blank and has a continuous upstanding rim 20 rising from the bowl bottom 19 to define a solid-fuel holding pan.

The fuels commonly used being charcoal, wood, or briquettes made from the same.

Figures 4, 5:
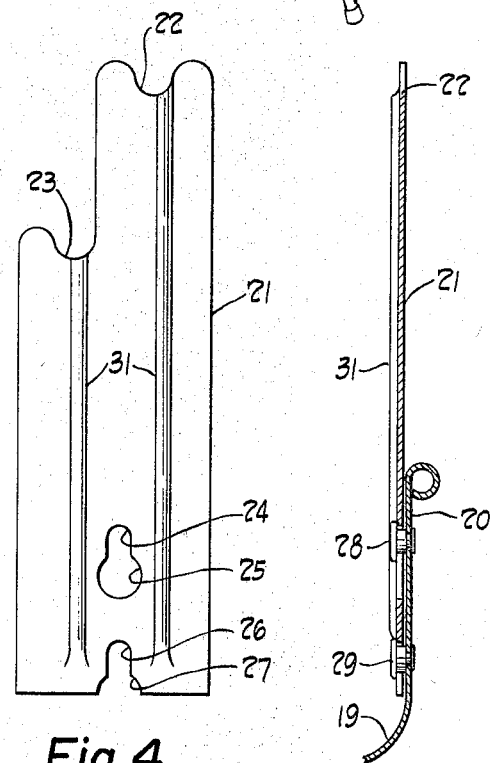
FIGURE 4 is a front elevation of one of the bracket members, in its unmounted condition.
FIGURE 5 is a vertical sectional view, taken along the line and in the direction of the arrows 5—5 of FIGURE 1; and, FIGURE 6 is a horizontal sectional view taken along the line and in the direction of the arrows 6—6 of FIGURE 1.

Paired, spaced and vertically aligned, headed studs, 28 and 29, are mounted in circumferentially spaced relation on the inner, curved, face of the rim 20, as is most clearly seen in FIGURE 5.

In the preferred form of the device, illustrated in FIGURE 1, there are 3 sets of such paired studs, but it is, of course, to be understood that more may be used, if thought necessary.

Reference numeral 21 indicates support brackets for the wire food retaining grating 32; one for each set of paired studs 28 and 29.

As seen in FIGURE 4, the brackets 21 are flat stampings having vertical stiffening ribs 31 formed thereon.

Each bracket 21 has a pair of vertically spaced and aligned mounting slots 24 and 26, at its lower end.

The upper slot 24 has a circular hole at its lower end, adapted receive the headed stud 28 therethrough.

The lower slot 26 has a half-round hole 27 adapted to receive the headed stud 29 therethrough.

Figure 2:
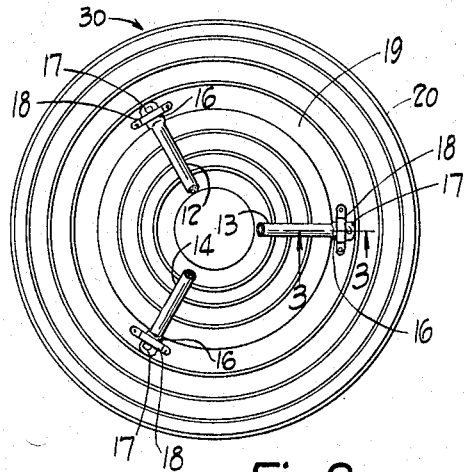
FIGURE 2 is a bottom plan view of the same, with a portion of the supporting tripod legs broken away.

Three, triangularly spaced, flexible straps, or clips, 18, are mounted on the underside of the fire bowl 30, as is seen most clearly in FIGURE 2.

Figure 6:
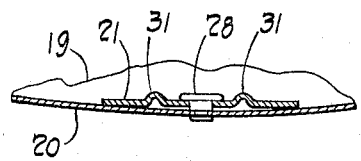

To assemble the device 10, the bowl 30 is mounted on the tripod 11 by expanding the legs 12, 13 and 14, as shown in FIGURE 1, and inserting the feet 16, at the upper ends thereof, through each of the bowl clips 18, as is seen most clearly in FIGURE 6, with the toe 17 positioned beyond the clip 18, thus locking the foot through the clip 18.

The so engaged clip 18 is locked between the leg 13 and the toe 17, securing the bottom 19, of the fuel bowl 30, firmly to the tripod legs.

The bracket mounting holes 25 and 27, of each bracket 21, are aligned with their respective paired stud heads 28 and 29, and the bracket pressed against the rim 20, while, at the same time, being pushed downward, to slide the slots 24 and 26 over the studs, behind the heads 28 and 29, thereof.

The side edges of the so engaged bracket 21 bear against the curved inner face of the rim 20, to frictionally lock the bracket in upstanding position on the rim 20, as seen in FIGURES 6, 5 and 1.

Reference numeral 32 indicates a circular food retaining wire grating, of conventional type, having mounting arms 33 and a handle 34, engageable with either of the upper slots 22 or 23 of the brackets 21.

The grating 32 is adapted to seat on either set of bracket slots 22 or 23, whereby the grating may be adjusted in height relative to the fuel bed in the bowl 30; being highest when supported in slots 22, lower on slots 23, and lowest when resting directly on the top edge of the bowl rim 20.

It will thus be seen that no screws or nuts and bolts are used to assemble this barbeque grille, all of whose parts are locked together through flexible friction joints.

The so constructed barbeque grille may be easily collapsed or erected without the use of any tools.

It will now be clear that there has been provided a device which accomplishes the objectives heretofore set forth.

While the invention has been disclosed in its preferred form, it is to be understood that the specific embodiment thereof, as described and illustrated herein, is not to be considered in a limited sense, as there may be other forms or modifications of the invention which should also be construed to come within the scope of the appended claim.

I claim:

A collapsible barbeque grille, comprising in combination, a circular sheet metal fuel bowl having a continuous circular upstanding rim; three, triangularly spaced, flexible, leg engaging clips mounted on the underside of the fuel bowl; a foldable tripod, having a laterally extending foot at the upper end of each leg, including a raised toe portion at the outer end of each foot, adapted to fit through the bowl clips and lock the bowl to the legs when the tripod is in its open, fuel bowl supporting position; the rim having, vertically paired, headed studs spaced circumferentially of the inner face thereof; a flat bracket mounted on each set of paired studs through vertically spaced and aligned slots at the bottom end thereof, engageable with the stud heads, to lock the bracket in vertical pressed engagement against the inner curved face of the fuel bowl rim; each bracket also having vertically spaced terminal slots at its upper end adapted to support a food retaining grating, in co-operation with the slots of associated brackets, in adjusted positions, parallel to the bottom of the fuel bowl.

References Cited by the Examiner

UNITED STATES PATENTS

| | | | |
|---|---|---|---|
| 2,477,529 | 7/1949 | Sprinkle et al. | 126—25 X |
| 3,191,592 | 6/1965 | Lorbacher | 126—9 X |
| 3,200,806 | 8/1965 | Goldstein | 126—9 X |

FOREIGN PATENTS

| | | |
|---|---|---|
| 558,101 | 6/1957 | Belgium. |
| 593,520 | 5/1959 | Italy. |

FREDERICK L. MATTESON, JR., *Primary Examiner.*

E. G. FAVORS, *Assistant Examiner.*